(12) United States Patent
Bach et al.

(10) Patent No.: US 9,098,472 B2
(45) Date of Patent: Aug. 4, 2015

(54) VISUAL CUES BASED ON FILE TYPE

(75) Inventors: Michael Bach, Seattle, WA (US); Simon Tan, Bellevue, WA (US); Vishal Joshi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 656 days.

(21) Appl. No.: 12/962,652

(22) Filed: Dec. 8, 2010

(65) Prior Publication Data
US 2012/0151438 A1 Jun. 14, 2012

(51) Int. Cl.
*G06F 9/44* (2006.01)
*G06F 17/21* (2006.01)
*G06F 17/30* (2006.01)

(52) U.S. Cl.
CPC .......... *G06F 17/211* (2013.01); *G06F 17/3012* (2013.01); *G06F 17/30126* (2013.01)

(58) Field of Classification Search
USPC ............... 717/124; 707/5, 100, 201; 705/7, 1; 273/153.5; 704/207; 725/115; 715/752, 715/785, 748; 439/152
IPC .................................................... G06F 17/211
See application file for complete search history.

(56) References Cited

U.S. PATENT DOCUMENTS

| | | | |
|---|---|---|---|
| 4,445,711 A | 5/1984 | Cunningham | |
| 6,069,630 A | 5/2000 | Lisle | |
| 6,766,352 B1 | 7/2004 | McBrearty | |
| 7,080,101 B1 * | 7/2006 | Watson et al. | 1/1 |
| 7,188,316 B2 | 3/2007 | Gusmorino | |
| 2004/0090472 A1 * | 5/2004 | Risch et al. | 345/853 |
| 2005/0240396 A1 * | 10/2005 | Childs et al. | 704/207 |
| 2006/0173873 A1 * | 8/2006 | Prompt et al. | 707/100 |
| 2006/0271417 A1 * | 11/2006 | Nguyen et al. | 705/7 |
| 2007/0128899 A1 * | 6/2007 | Mayer | 439/152 |
| 2007/0276676 A1 * | 11/2007 | Hoenig et al. | 705/1 |
| 2008/0010599 A1 * | 1/2008 | Janakiraman et al. | 715/748 |
| 2008/0104535 A1 * | 5/2008 | DeLine et al. | 715/785 |
| 2008/0301127 A1 * | 12/2008 | Gilmer et al. | 707/5 |
| 2009/0007071 A1 * | 1/2009 | Peipelman et al. | 717/124 |
| 2009/0210919 A1 * | 8/2009 | Zhou | 725/115 |
| 2011/0265012 A1 * | 10/2011 | Koopman | 715/752 |
| 2012/0049450 A1 * | 3/2012 | Agamawi | 273/153 S |

OTHER PUBLICATIONS

Chang et al, "Gestalt Theory in Visual Screen Design" Copyright 2002, p. 1-8 <>.*
Xplorer Online Help: User Interface Customization; Sep. 10, 2010; 4 Pages;http://www.zabkat.com/x2h_8_html.

(Continued)

*Primary Examiner* — Tuan Vu
(74) *Attorney, Agent, or Firm* — Jim Banowsky; Kate Drakos; Micky Minhas

(57) ABSTRACT

The subject disclosure relates to providing more effective visual cues for distinguishing between files based upon file types. Given that users typically browse and select files based upon their file types, and further that various collections of files often share identical or similar naming conventions, the subject disclosure provides a useful mechanism to reduce the need for close inspection of file names in order to locate desired files. In particular, various file types can be assigned to a set of groups and each group can be associated with a particular color. Thus, visual representations (e.g., icons or tabs) of the various files can be presented with a color-coded element to serve as the visual cue.

19 Claims, 13 Drawing Sheets

(56) References Cited

OTHER PUBLICATIONS

File Management at SnapFiles.com; Sep. 6, 2010; 14 Pages; http://www.snapfiles.com/freeware/system/fwfilemanagement.html.

Josh Pigford; Beginning Mac: Color Labels; Mar. 2, 2008; 9 Pages; http://theappleblog.com/2008/04/02/beginning-mac-color-labels/.

Shengyin Gu, et al; Tree Q-VISA: An Interactive Tree Visualization Tool with Functional Annotation Query Capabilities; Nov. 2006; 4 Pages; http://bioinformatics.oxfordjournals.org/content/23/6/764.full.

Accutrac Records Management Software Integrates with TABQuik to Provide Seamless Color-Coded Label Creation; Mar. 24, 2005; 3 Pages; http://www.thefreelibrary.com/Accutrac+Records+Management+Software+Integrates+wit . . . .

Jonathan Allen; Major UI Upgrade for Visual Studio 2010; Jun. 8, 2010; 2 Pages; http://www.infoq.com/news/2010/06/VS2010-UI.

\* cited by examiner

| 108 | 202 | 110 ⟵ 400 |
|---|---|---|
| EXAMPLE CATEGORIES/ GROUPS | EXAMPLE FILE TYPES | EXAMPLE COLORS |
| HTML | *.htm, *.html, *.hta, *.htc, *.ss, *.tpl | #f2c566 (E.G., ORANGE) |
| CSS | *.css | #e98583 (E.G., RED) |
| JAVASCRIPT | *.js | #91d6b6 (E.G., GREEN) |
| PURE CODE | C#: *.cs; VB: *.vb, *.vbs | #b2add2 (E.G., PURPLE) |
| MIXED CONTENT | ASP.NET: *.aspx, *.asmx, *.asax, *.ascx *.master, *.skin, *.svc; CLASSIC ASP: *.asp, *.asa; RAZOR (NEW): *.cshtml, *.vbhtml; RAZOR (CLASSIC): *.aspq; PHP: *.php, *.phps, *.class, *.install, *.module, *.ini, *.inc | #80b1d3 (E.G., BLUE) |
| XML + SQL | XML: *.xml, *.config, *.xaml, *.xoml *.csproj, *.settings, *.xsd, *.xsl *.xslt, *.wsdl, *.browser, *.mxml, *.dbml, *.user; RESOURCE: *.resx; SQL: *.sql | #e4e4af (E.G., YELLOW) |

FIG. 4

VISUAL CUES BASED ON FILE TYPE

TECHNICAL FIELD

The subject disclosure relates to visually distinguishing files presented in a software user interface based upon file type.

BACKGROUND

Software applications can interact with a wide variety of files. A software development tool or a file manager represent just two such examples. Users of these applications can interact with the files displayed in the interfaces in different respects; one way of doing so is by the relevance of file types in a given application's behavior. For example, file types are used by operating systems to determine how to open files. In addition, file types are used by editors to determine how to format or display files, and so forth.

As the number of file types a user works with increases, a user may become overwhelmed. In particular, tasks that become more difficult with an increase in file type variety include: navigation between open files from a collection, addition of new files into a collection and identification of individual files included in the collection.

For example, it is a common scenario when interfacing with a file system or when working in a development environment to be presented with a large list of file names. For instance, a user can open a file manager, which presents scores of files that exist in a particular directory. Depending on the view, these files can be represented by predefined icons or thumbnails. As another example, a developer utilizing an integrated development environment, or an editor or another application, can have many files open in the editor with each open file displayed as a selectable tab on a navigation bar of the editor.

In either case, a situation can arise in which a user desires to quickly locate a particular file. In conventional systems, it is often the case that the user is unable to do so without close inspection of individual file names. Compounding the difficulty of this task, many files can actually have the same file name differing only in the file extension (i.e. the same prefix, but different extension). For example, a web developer might desire to change the style of a webpage and therefore search for a ".css" file representing a cascading style sheet file type, and search specifically for the file named: "main.css". However, within the same view, there might also be several other files named "main.htm", "main.js" and so on. Inadequate scrutiny of the file extensions results in errors while attempting to select the desired file.

Furthermore, many modern systems no longer display file extensions in certain user interfaces or views of a given user interface, opting instead for display of the prefix (e.g., "main") along with a registered icon or thumbnail. However, in either case, whether a user distinguishes based upon a file name or a file name prefix in conjunction with an icon, the task remains largely inefficient. In other words, neither file names nor icons have been shown to optimally enable users to quickly distinguish between file types.

The above-described deficiencies of today's techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, the disclosed subject matter relates to an architecture that can facilitate visual cues in connection with file type groupings. In accordance therewith, the architecture can include a categorization component that can be configured to assign a file to a group based upon the file type of the file. Moreover, each group can be associated with a different color such that files assigned to a given group can therefore be associated with the color that is designated for the group.

In addition, the architecture can include a gestalt component that can be incorporated into a file system of an operating system as well as with file editors or other applications that provide views associated with files. The gestalt component can be configured to apply the color to a visual representation (e.g., an icon or tab) of the file wherever the visual representation is presented. For example, a color-coded strip or other colored visual object can be applied to visual representations of the file, and therefore serve as a visual cue distinguishing various classes of file types.

Moreover, a common color-coding scheme can be employed throughout all views. For example, a common color-coding can be employed for tree views, summary views, tabbed views, or dialog views. Thus, users can associate colors to particular file types in a consistent manner, while engaging in a variety of tasks. In addition, common use can further reinforce a given color mapping, and ultimately enable users to work with files more efficiently over time.

These and other embodiments are described in more detail below.

BRIEF DESCRIPTION OF THE DRAWINGS

The system and methods are further described with reference to the accompanying drawings in which:

FIG. 4 is an exemplary table depicting an example arrangement for groups, file types, and colors;

DETAILED DESCRIPTION

Overview

Figure 1:
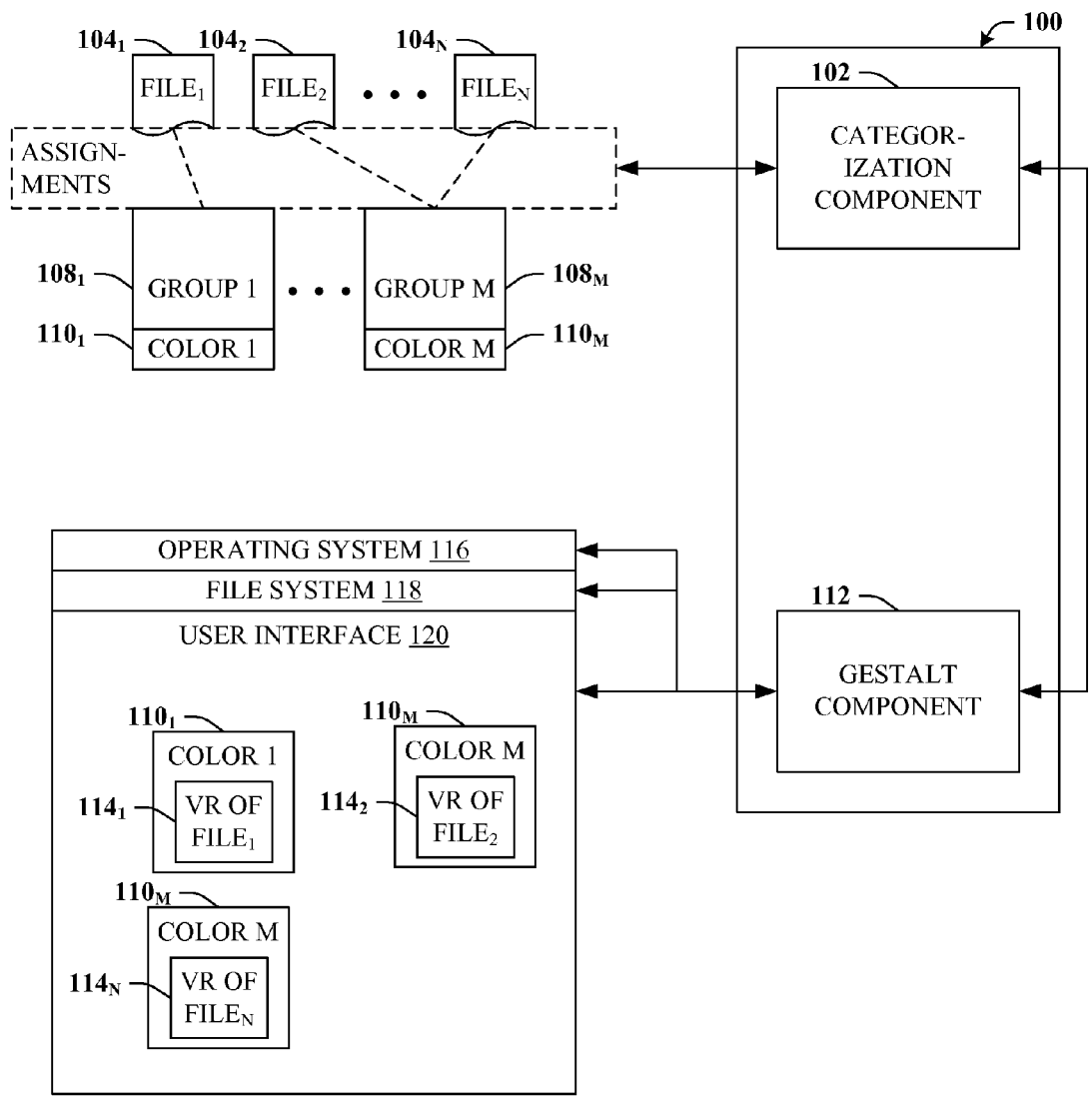
FIG. 1 illustrates a block diagram of an exemplary non-limiting system that can facilitate visual cues in connection with file type groupings.

By way of an introduction, the subject matter disclosed herein relates to various embodiments to facilitate visual cues in connection with file types. In particular, the subject matter can provide a mechanism for enabling a user to quickly locate a desired file without the traditional degree of scrutiny required. As outlined in the Background section, neither file names nor icons have been shown to optimally enable users to quickly distinguish between file types.

A possible reason for this difficulty in distinguishing individual files lies in how the human mind processes visual data. In the domain of psychology, the term "gestalt" means a "unified whole" and relates to theories of visual perception. Gestalt principles attempt to describe how people tend to organize visual elements into groups when certain visual characteristics are applied. Gestalt principles include the principles of similarity, continuation, closure, proximity, and so forth, but ultimately argue that humans naturally group items based upon color, shape, pattern, or number, when each of these characteristics are relatively uniform. Both text (e.g., a file name) and icons fail to be very useful under gestalt principles because there are simply too many varieties. For example, there are literally hundreds, if not thousands, of different icons for file types possible. Likewise, there are even more potential combinations of letters that can be used to form file names. Thus, neither text nor icons are able to serve as useful benchmarks for visual perception under gestalt principles. Users do not readily or naturally distinguish these visual characteristics.

As such, the subject disclosure provides a mechanism for categorizing one or more file types into a set of groups. Each group can then be associated with a different color. Once assigned, the color associated with a group to which a particular file belongs can be presented as a visual representation of that file. For example, visual representations such as an icon or a tab or tree element can be augmented with the color. How colors are applied can change based upon the particular view that includes various visual representations, yet the color displayed will typically be common among all views. For example, the color can be displayed as one or more thin highlights adjacent to an outer edge of an icon or other UI element, e.g., a colored border, a background coloring, a watermark, a text font, a glowing effect, and so forth. Moreover, visual representations of files that do not suitably belong to any defined group can be assigned to a null group and/or be displayed with a neutral or otherwise distinguishing color, such as black or gray.

Furthermore, in some embodiments, the number of groups, and therefore the number of associated colors, can be expressly limited to six or fewer. By limiting the number of groups to six or fewer, gestalt principles that teach automatic visual recognition can be effectively leveraged. In addition, six or fewer colors allows the use of the three primary colors (red, yellow, and blue) and the three secondary colors (green, purple, and orange), which are markedly visually distinguishable. For the avoidance of doubt, other numbers of colors greater than six can be selected for implementation in other embodiments.

Additionally, it is understood that colors are not the only possible application associated with the subject matter disclosed herein. For example, other visual cues can be employed in addition to color or as an alternative. In particular, other visual cues identified by gestalt principles, such as shape, pattern, or number (i.e., a number of elements as opposed to an alphanumeric character), or the like. Thus, instead of (or as well as) color, groups can be associated with a particular shape, pattern, or number. Likewise, any such visual cue can be applied as detailed herein with respect to color.

Visual Cues in Connection with File Type

Referring now to the drawings, with reference initially to FIG. 1, system 100 that can facilitate visual cues in connection with file type groupings is depicted. Generally, system 100 can include categorization component 102 that can be configured to assign at least one file $104_1$-$104_N$ to one or more groups $108_1$-$108_m$ associated with one or more colors $110_1$-$110_m$. It is understood that groups can be associated with other visual cues as well, e.g. certain shapes, patterns, or substantially any visual cue that can leverage gestalt principles or otherwise serve to visually distinguish them. It is also understood that N and M can be substantially any positive integer, and further that at least one file $104_1$-$104_N$, one or more groups $108_1$-$108_m$, and one or more colors $110_1$-$110_m$ can be respectively referred to herein, either collectively or individually as file(s) 104, group(s) 108, or color(s) 110, with appropriate subscripts employed generally only when instructive or convenient to highlight various distinctions or to better impart the disclosed concepts.

However, while not necessarily limited to such, M will tend to be a relatively small number, e.g., five or six. In such cases, there can be a relatively small number of groups 108, and by proxy a relatively small number of colors 110. By keeping M relatively small, the disclosed subject matter can therefore be well suited to effectively leverage gestalt principles detailed herein. Regardless, as introduced above, categorization component 102 can assign file 104 to group 108, wherein group 108 is associated with color 110. In one or more embodiment, categorization component 102 can be further configured to assign file 104 to group 108 based upon an extension associated with file 104, which is, inter alia, further detailed in connection with FIG. 2.

Figure 2:
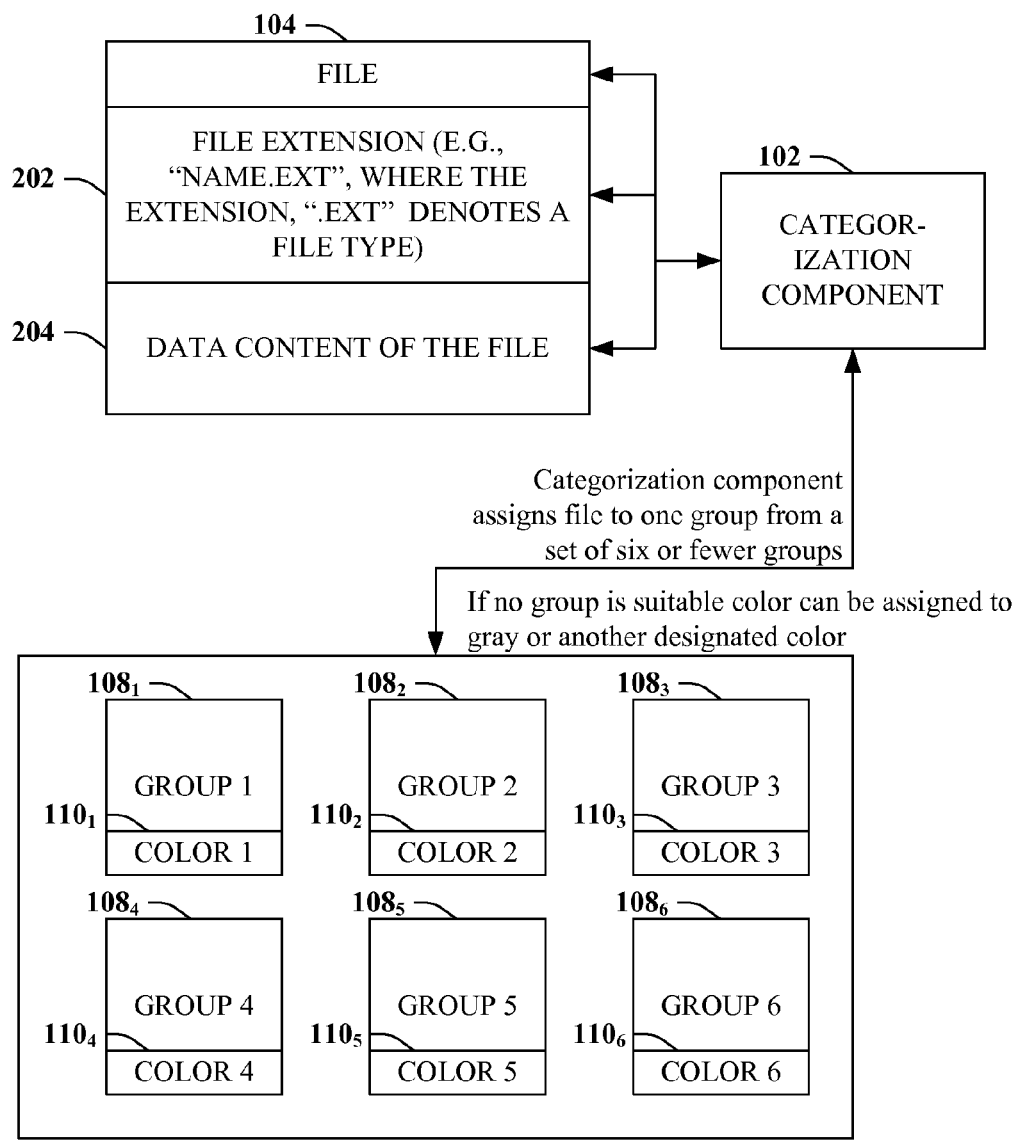
FIG. 2 illustrates a block diagram of an exemplary non-limiting system that illustrates additional features or detail in connection with categorization component.

While still referring to FIG. 1, but turning now as well to FIG. 2, system 200 that illustrates additional features or detail in connection with categorization component 102 is provided. As illustrated categorization component 102 can examine file 104 and, in particular, file extension 202 in order to assign file 104 to group 108 in an appropriate manner. Additionally or alternatively, in one or more embodiment, categorization component 102 can be further configured to assign file 104 to group 108 based upon an examination of data content 204 included in file 104. Hence, categorization component 102 can assign file 104 to group 108 based upon extension 202 or based upon data contents 204, the latter of which can be useful even when file 104 is improperly labeled or as an added verification layer.

In addition, in one or more embodiment, categorization component 102 can be further configured to assign file(s) 104 to group 108, wherein group 108 is a member of a set of no more than six groups 108$_1$-108$_6$. In other words, the number of groups 108 can be expressly restricted to six or fewer and each such group can be associated with a different color 110, respectively, illustrated here as colors 110$_1$-110$_6$. In cases in which the file type does not belong to any group 108, categorization component 102 can catalog the file in various ways. As a first example, categorization component 102 can assign the file in question to a group determined (possibly with various means of machine intelligence or user input) to be the closest match. In other cases, categorization component 102 can designate the file as a non-grouped file, to which that file can be assigned a specific non-color, such as gray or black.

Regardless, by restricting groups 108 to six or fewer, a number of advantages can be realized. First, six or few colors 110, one for each group 108, allows the operation of gestalt principles, such that visual characteristics of distinction between any two colors 110 can be instantly recognized without unnecessary scrutiny or inspection. Second, employing six (or fewer) colors 110 allows convenient leverage of the three primary colors and the three secondary colors for assignment, which is further detailed in connection with FIG. 3.

Figure 3:
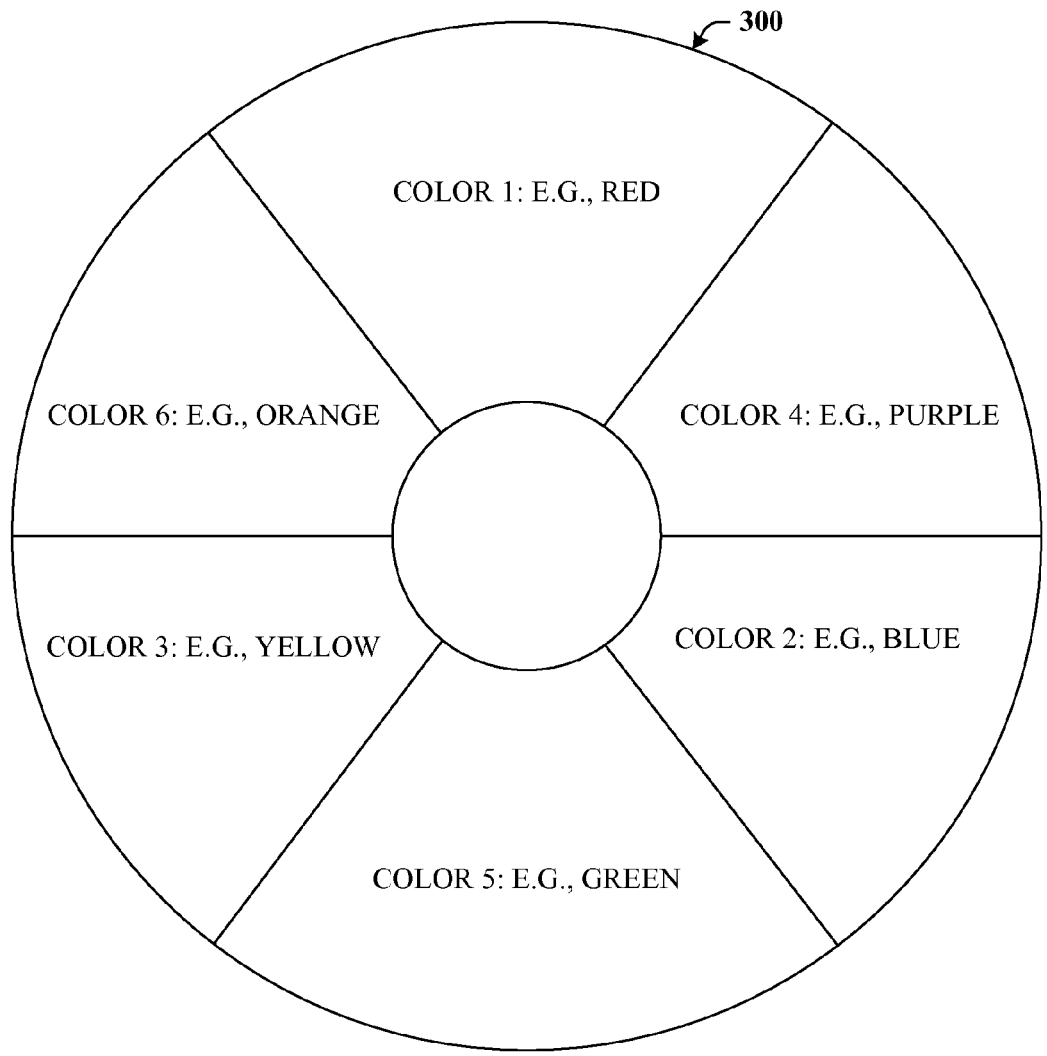
FIG. 3 illustrates an exemplary graphical illustration that depicts an example color wheel that includes three primary colors and three secondary colors.

Turning now to FIG. 3, example color wheel 300 that includes three primary colors and three secondary colors is depicted. As noted previously, by utilizing no more than six groups 108, the color 110 associated with a given group 108 can be a primary color comprising red, blue, or yellow, or a secondary color comprising purple, green, or orange, which are depicted by example color wheel 300. For instance, the three primary colors are illustrated with red at the top of example color wheel 300, blue at the bottom right, and yellow at the bottom left. Likewise, the three secondary colors are interlaced with the primary colors, with purple depicted at the top right, green at the bottom and orange at the top left.

Still referring to FIG. 1, system 100 can further include gestalt component 112 that can, as with other components detailed herein, be included in a computer-readable storage medium. Moreover, gestalt component 112 can be operatively coupled to file system 118 of operating system (OS) 116 or to another application with user interface 120, such as an editor or a development environment (e.g., an integrated development environment (IDE)). Regardless, gestalt component 112 can be configured to apply color 110 (e.g., the color associated with a group to which a given file belongs) to a visual representation 114$_1$-114$_N$ of file 104 presented by OS 116. It is understood, as with other reference numerals used herein, visual representations 114$_1$-114$_N$ can be referred to either individually or collectively as visual representation(s) 114.

As depicted in this example, and further detailed in connection with FIG. 7, interface 120 is associated with a file manager that displays visual representations 114 as icons within a directory. To, e.g., enable instant classification of each of the files associated with respective icons, gestalt component 112 applies the associated color 110, which in this case is a border surrounding the icons. However, this does not necessarily need to be the case. For example, gestalt component 112 can instead be configured to apply a thin color bar to the top or bottom of the icons or to one or more of the sides. In other embodiments, gestalt component 112 can be configured to apply color 110 to a background for the icons or to a font color of associated text (e.g., a file name), and so on.

Figure 6:
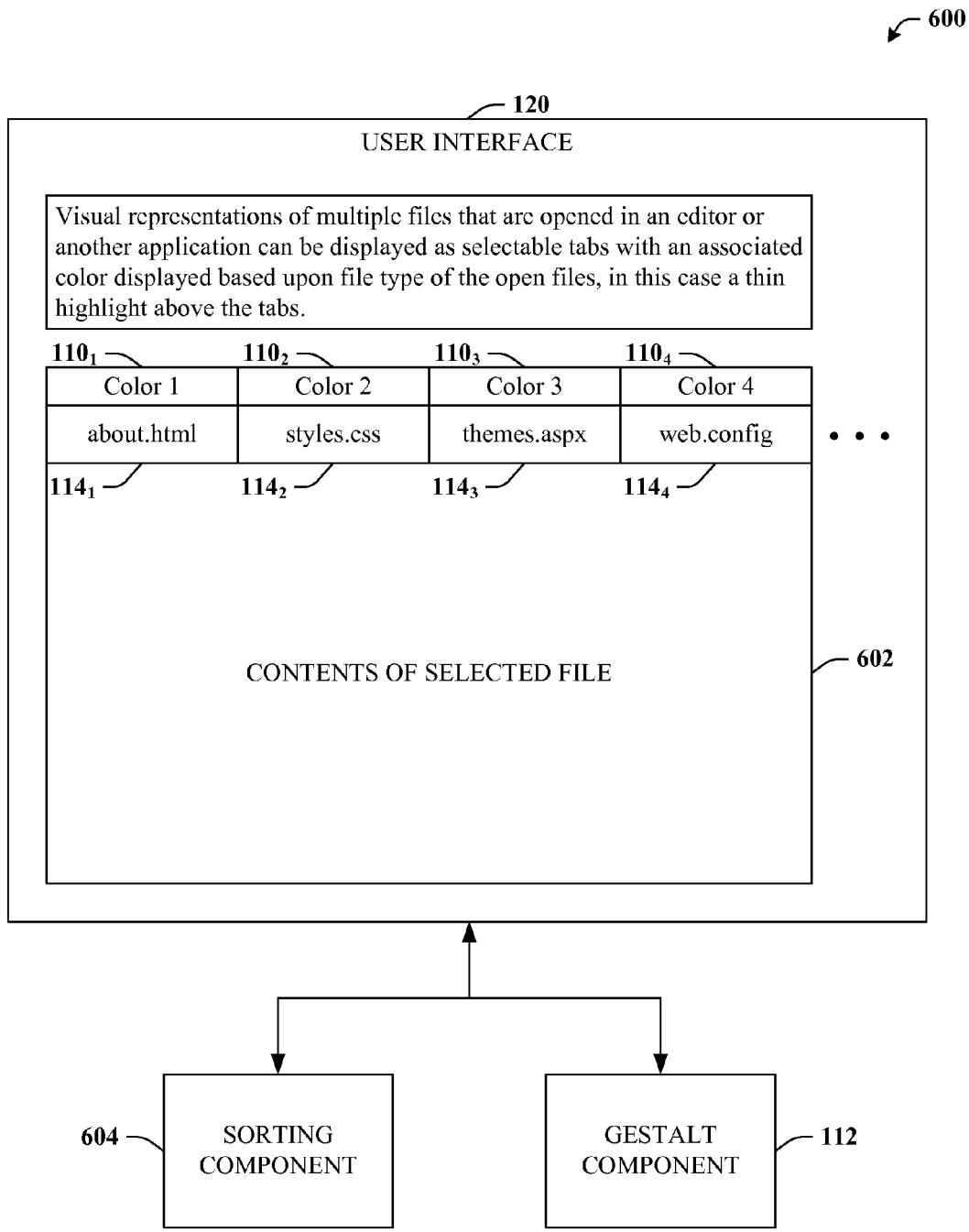
FIG. 6 is block diagram of an exemplary system that can apply a color to a tabbed view.
Figure 7:
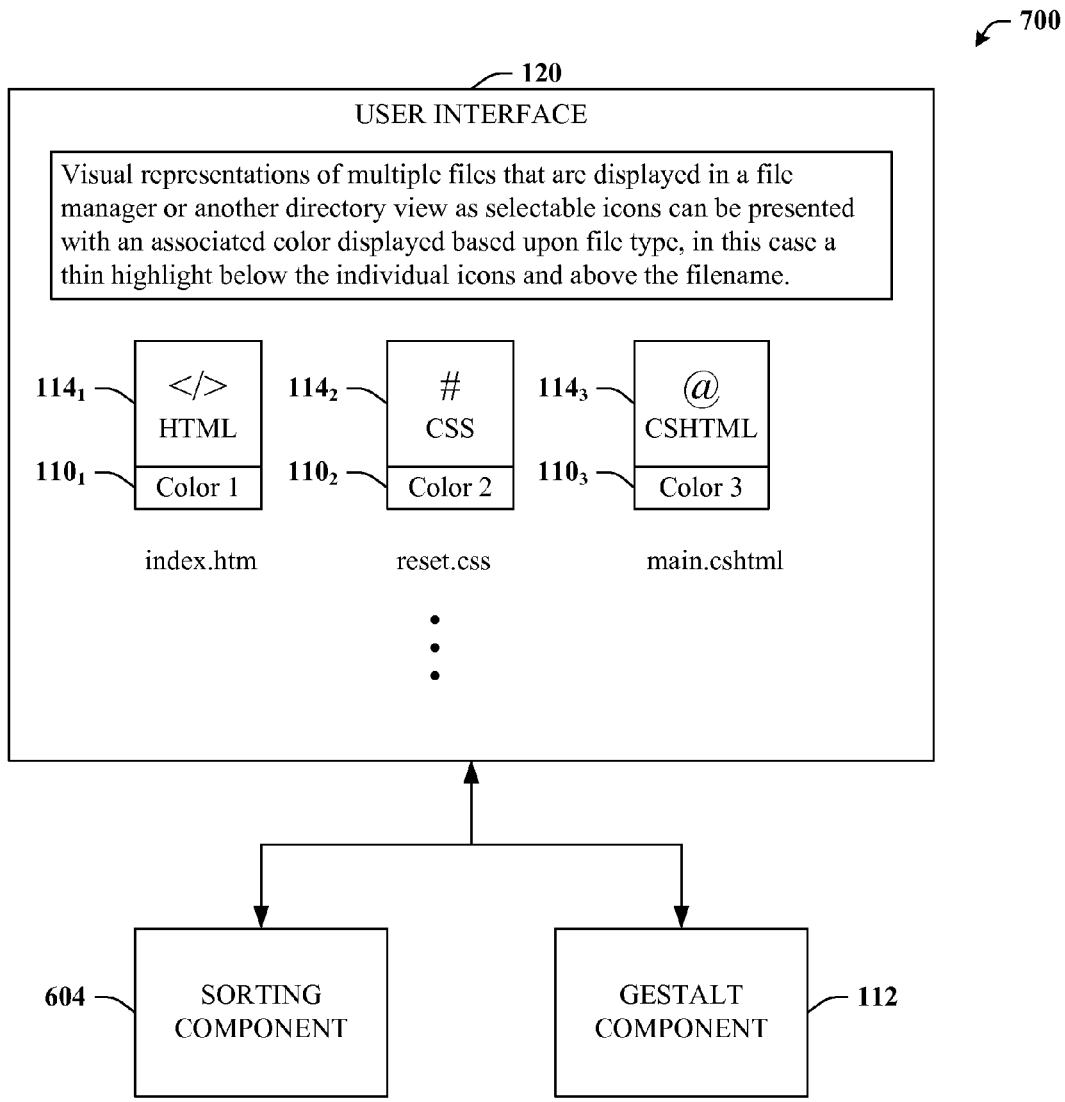
FIG. 7 is block diagram of an exemplary system that can apply a color to a directory view.

Additional aspects associated with gestalt component 112 can be found with reference to FIGS. 6 and 7, infra.

It is understood that categorization component 102 can manage the assignment of files 104 to particular groups 108 based upon file type. However, the actual designation of groups 108 (e.g., which file types belong) as well as the designation of which colors 110 are to be associated with respective groups 108 can be implemented in a variety of ways, a few of which are addressed in connection with FIGS. 4 and 5 below.

With reference now to FIG. 4, table 400 depicts an example arrangement for groups 108, file types 202, and colors 110. In particular, a first group can be associated with hypertext markup language (HTML) files, as indicated in the first column. As such, all files of a file type that can be classified as HTML files can be assigned to the first group. Such files can include, e.g., at least one of the following extensions: .htm, .html, .hta, .htc, .ss, or .tpl, as indicated by the second column. In the third column, a hexadecimal value that defines an orange color can be associated with the first group. As such, various visual representation(s) 114 of files that are categorized as belonging in the first group can be presented with an orange object.

Likewise, a second group can be associated with cascading style sheet files with a .css extension, and assigned to the primary color red; whereas, a third group can be associated with JavaScript files with a .js extension and associated with the secondary color green. Similarly, a fourth group can be associated with code-based files with at least one of the following extensions: .cs, .vb, or .vbs, and assigned to the color purple. A fifth group can be associated with files that can represent a mixture of code-based content and HTML content with the following extensions: .aspx, .asmx, .asax, .ascx, .ashx, .master, .skin, .svc, .asp, .asa, .cshtml, .vbhtml, .aspq, .php, .phps, .class, .install, .module, .ini, or .inc. The fifth group can be associated with the primary color blue. Moreover, a sixth group can be associated with extensible markup language (XML) or structured query language (SQL) files with the following extensions: .xml, .config, .xaml, .xoml, .csproj, .settings, .xsd, .xsl, .xslt, .wsdl, .browser, .mxml, .dbml, .user, .resx, or .sql. The sixth group can be associated with the primary color yellow.

While the above represents a very specific example geared towards web development, it is understood that other combinations or configurations can be applicable. For example, other types of development- and non-development-oriented applications can define groups 108 and associated colors 110 in a different manner, register different sets of file types. Thus, while the above-described example can be a default configuration associated with web development, other default configurations can be stored and selected based upon the application. For example, default configurations can be provided that divide file types based on client-server associations or other common groups. Moreover, in one or more embodiment, such configurations can be modified either by an authorized entity, based upon an intelligent determination or inference, or based upon user input as is further detailed in connection with FIG. 5.

Figure 5:
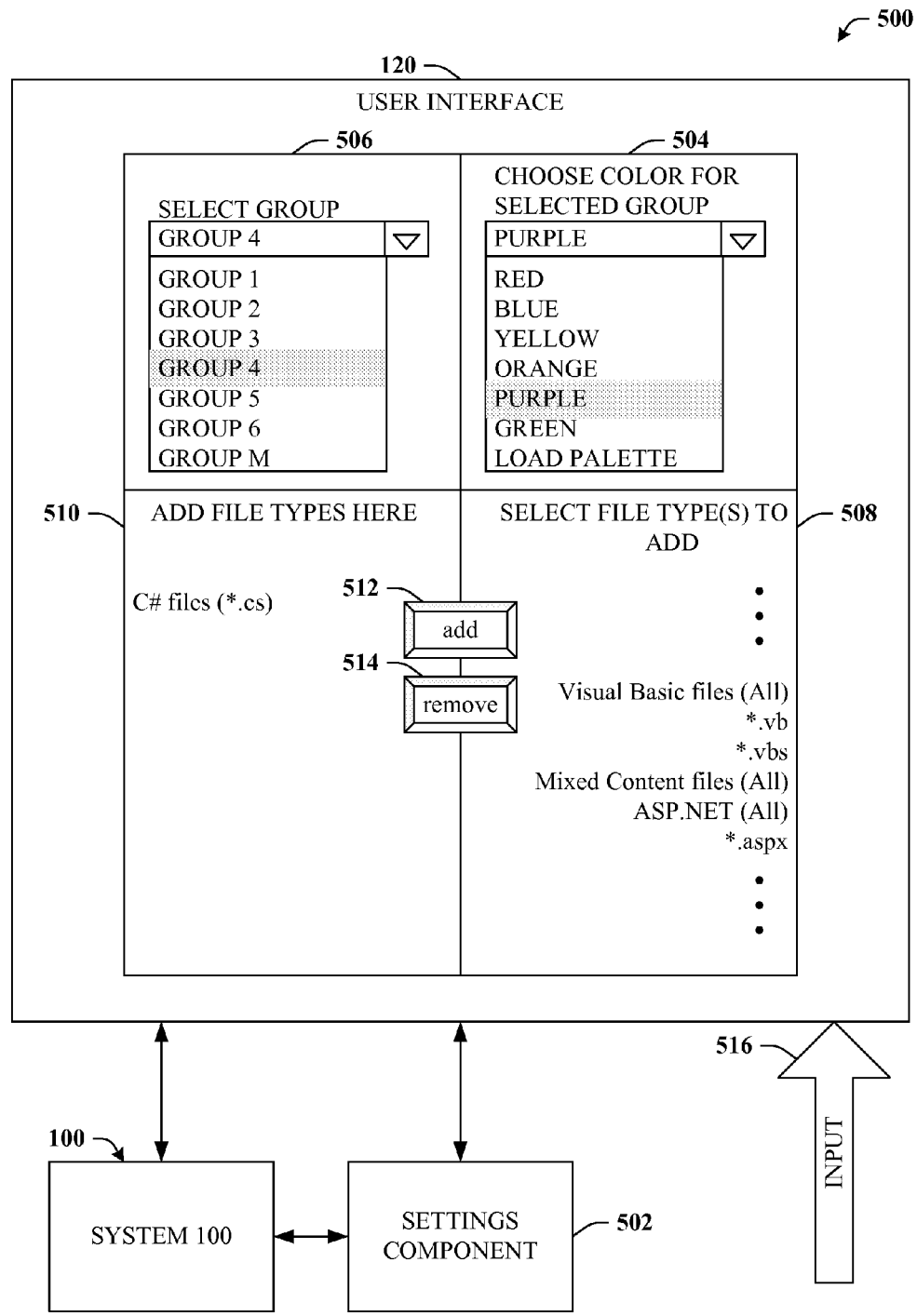
FIG. 5 is block diagram of an exemplary system with user interface elements or objects that can provide for configurable settings in connection with visual cues for file types.

Turning now to FIG. 5, system 500 that can provide for configurable settings in connection with visual cues for file types is illustrated. In particular, while table 400 of FIG. 4 provided one example of a predetermined configuration, system 500 can enable manual designation of the visual cues detailed herein, e.g., by way of user interface 120. Hence, in one or more embodiment, settings component 502 can be configured to enable associations between groups 108, colors 110, and/or file types 202 based upon one or more selections.

As depicted, settings component 502 can be operatively coupled to other components detailed herein, such as those included in system 100.

In accordance therewith, user interface 120 can provide various selection mechanisms, such those presently depicted. Specifically, user interface 120 can provide color selection mechanism 504, group selection mechanism 506, select file types list 508, and selected file types list 510, all of which can be defined, configured, or updated based upon input 516 received by user interface 120.

In this case, both color selection mechanism 504 and group selection mechanism 506 are drop-down menus, yet it is understood that other user interface elements or objects can be employed as well, such as radio buttons, check boxes, or the like. Similarly, select file types list 508 and selected file types list 510 are depicted such that items can be selected on the right (e.g., select file types list 508), followed by activation of add button 512, whereupon the selected item can be displayed on the left (e.g., selected file types list 510). In an analogous manner, items can be removed from selected file types list 510 by way of remove button 514. However, other means for choosing which file types are associated with a particular group are envisioned, such as drag-and-drop mechanisms or the like.

In the present example, six groups are specifically listed in the drop-down menu of group selection mechanism 506, yet it should be appreciated that M groups can be available for selection. Likewise, the drop-down menu of color selection mechanism 504 displays six colors associated with the primary colors and the secondary colors. However, other colors can be included as well as a selection associated with a palette, e.g., to choose other colors as desired. In this case, Group Four is selected and associated with the color purple, as denoted by the gray selection indicators.

Referring now to FIG. 6, system 600 that can apply a color to a tabbed view is depicted. Generally, system 600 can include user interface 120 that can be configured to display visual representations 114 of one or more file 104. In this scenario, the view displayed by user interface 120 is a tabbed view in which visual representations 114 of various files 104 are displayed as selectable tabs. As illustrated, four (and potentially several more) files, namely "about.html", "styles.css", "themes.aspx", and "web.config" that are opened for viewing or editing by an editor or another application can be displayed as selectable tabs, with contents 602 of the file 104 associated with the selected tab presented. Thus, gestalt component 112 can be configured to apply color 110 to the tabbed view of visual representations 114 of files 104. In this case, color 110 is a thin highlight above the respective visual representations 114 on the tab navigation bar.

Thus, returning again to the example introduced above in which a web developer desires to change the style of a webpage, and further assuming several more files 104 are open in the editor, the developer need not painstakingly inspect file names or icons to locate the .css file. Rather, the user can visually scan for a particular color 110, and then distinguish based upon file name only if multiple visual representations 114 are present with the same color 110. The latter procedure has been found to be the more efficient scheme, typically enabling users to locate or select the desired file more easily and/or more rapidly.

Moreover, in one or more embodiments, system 600 (as well as other systems detailed herein, such as system 100 for example) can further include sorting component 604 that can be configured to sort respective visual representations 114 of files 104 as a function of color. As such, in this case where visual representations 114 are presented as tabs for an application or editor, sorting component 604 can re-arrange the ordering of the tabs based upon colors. For example, sorting component 604 can order tabs according to a predetermined ordering, either selected or default. Additionally or alternatively, sorting component 603 can order tabs according to wavelength spectrum (e.g., in ascending or descending order according to frequency or wavelength of various colors of light), according to size (e.g., colors with the fewest/most instances ordered first/last), according to a particular color wheel such as color wheel 300, and so forth.

Turning now to FIG. 7, system 700 that can apply a color to a directory view is illustrated. In generally, system 700 can include user interface 120 that can be configured to display visual representations 114 of one or more file 104. Distinct from that of FIG. 6, in this scenario, the view displayed by user interface 120 is a directory view in which visual representations 114 of various files 104 are displayed within a directory or other file system attribute as selectable icons, with associated file names displayed below the various icons. As illustrated, three (and potentially several more) files, namely, index.html, reset.css, and main.cshtml exist in the current file structure, any of which can be selected, e.g., by clicking or based upon another user gesture. As depicted, each icon includes a tiny graphic suggestive of file type.

In this scenario, gestalt component 112 can be configured to apply color 110 to the directory view of visual representations 114 of files 104. In this case, color 110 is a thin highlight below the respective visual representations 114 of each icon and above respective file names. It is understood that other embodiments of color 110 can be applicable, such as background shading, watermarks, updating font color with the associated file names, and so forth. In addition, sorting component 604 can be employed in this scenario as well to arrange the order or location of respective icons based upon associated colors.

Figure 8:
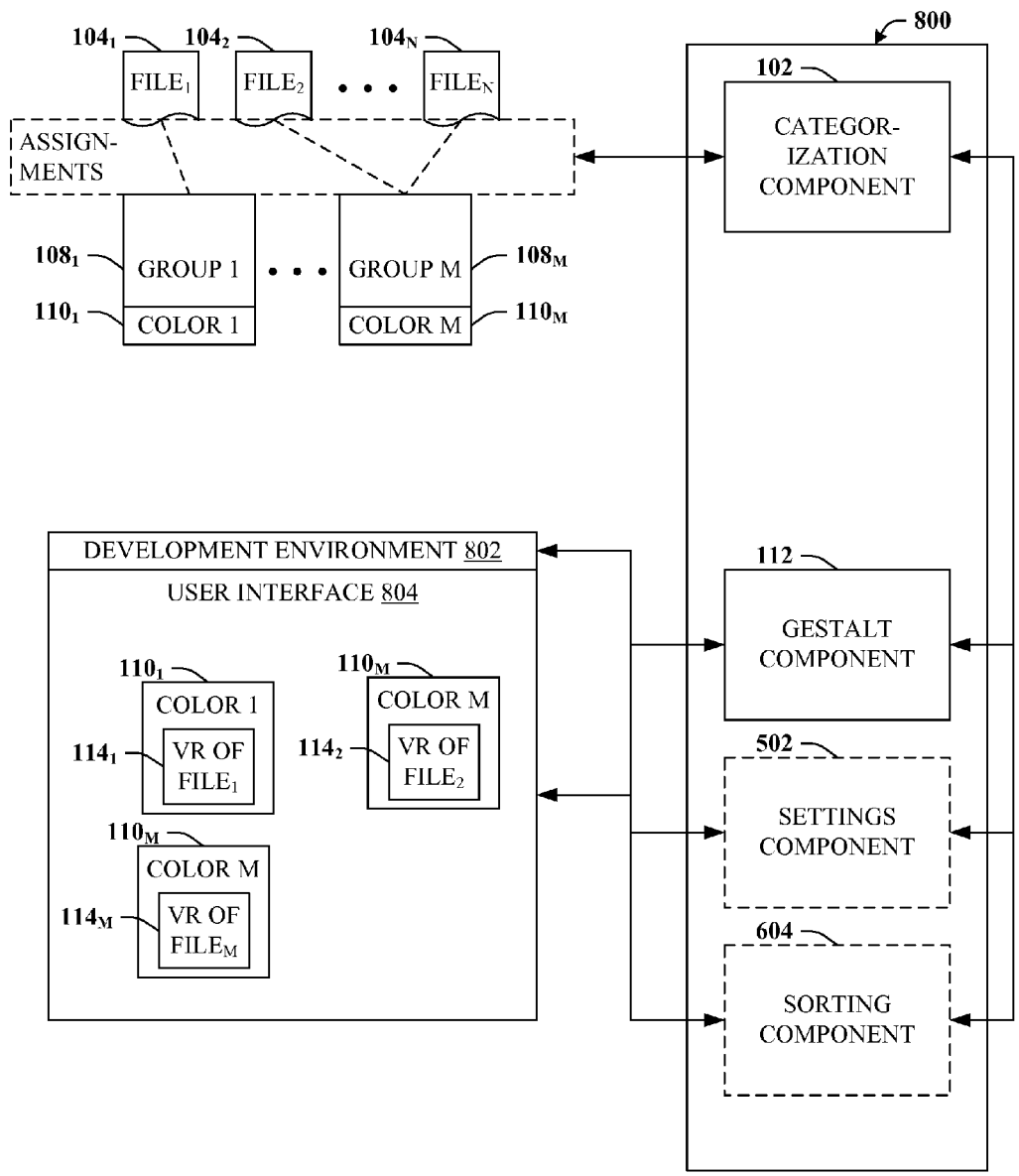
FIG. 8 is block diagram of an exemplary system that can facilitate visual cues for file types in connection with software development.

With reference now to FIG. 8, system 800 that can facilitate visual cues for file types in connection with software development is provided. Generally, system 800 can include categorization component 102 that can be configured to catalog file 104 based upon an examination of a file type 202 of file 104. In particular, categorization component 102 can be configured to catalog file 104 into group 108 that is associated with color 110, as substantially detailed supra in connection with FIG. 1.

Furthermore, system 800 can include gestalt component 112 that can operatively couple to development environment 802, and can be configured to present color 110 in connection with visual representation 114 of file 104. As depicted, visual representation 114 can be displayed in user interface 804 that is associated with development environment 802. Development environment 802 can be substantially any development environment, which can include an editor or other application employed for viewing or modifying contents of file(s) 104 as well as file managers for displaying file(s) 104. In one or more embodiment, development environment 802 can be a development environment associated with webpage development.

Similar to that detailed above, in one or more embodiment, categorization component 102 can be further configured to catalog file 104 into group 108 based upon an extension associated with file 104 or based upon an analysis of content included in file 104. Furthermore, categorization component 102 can be further configured to catalog file 104 into group 108, wherein group 108 is a member of a set of exactly six groups (e.g., M=6) associated with six respective colors, which can be comprised of three primary colors (e.g., red, yellow, and blue) and three secondary colors (e.g., orange, green, and purple).

In addition, system 800 can optionally include settings component 502 that can be configured to enable associations between group(s) 108, color(s) 110, and/or file type(s) 202. Accordingly, settings component 502 can enable or provide a suitable configuration tool or other input mechanism for making such associations. Thus, associations between group(s) 108, color(s) 110, and/or file type(s) 202 can be based upon at least one selection input to the configuration tool and/or to user interface 804.

Furthermore, system 800 can also optionally include sorting component 604 that can be configured to sort visual representations 114 of files 104 as a function of color 110, as substantially detailed supra. In one or more embodiment, gestalt component 112 can be further configured to present color 110 to a tabbed view of visual representations 114 of files 104, or to a directory view of visual representations 114 of file 104. In either case, sorting component 604 can affect a desired order or arrangement of visual representations 114.

Figure 9:
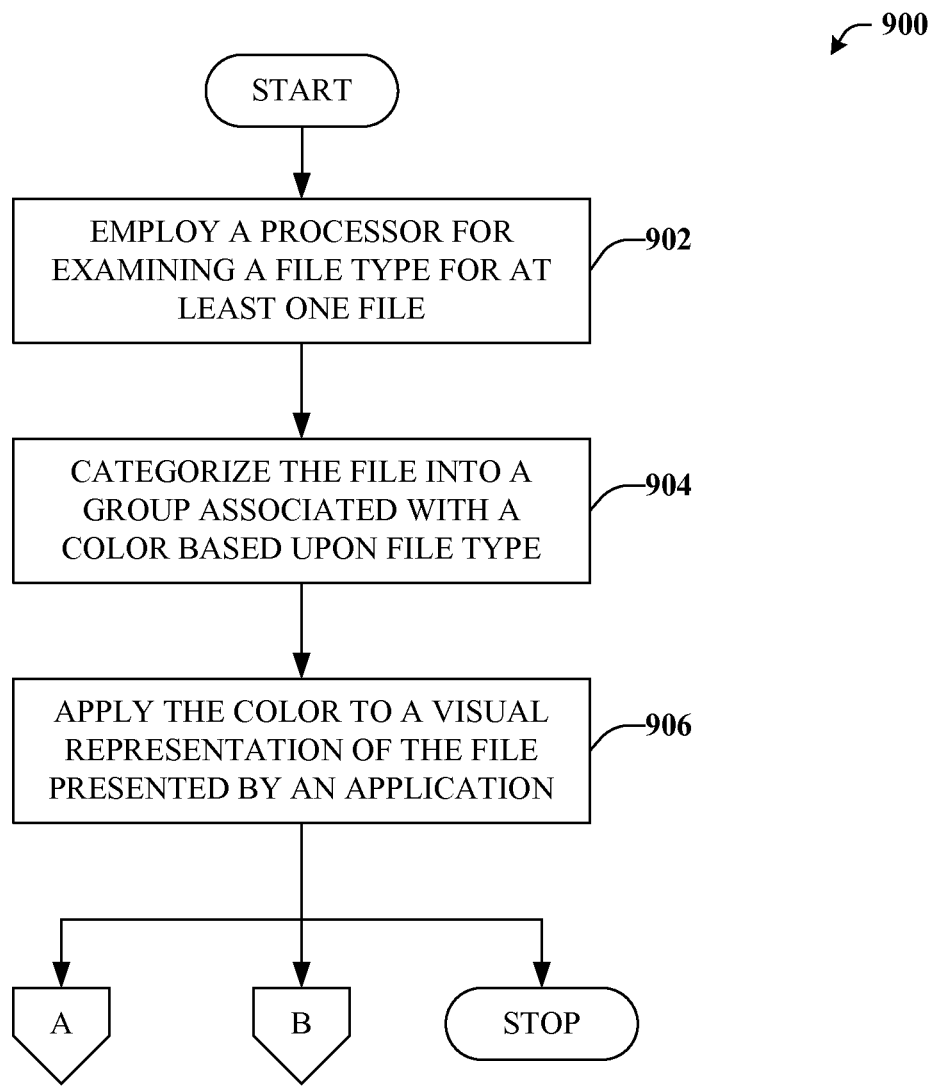
FIG. 9 is an exemplary non-limiting flow diagram for facilitating visual cues in connection with file types.
Figure 10:
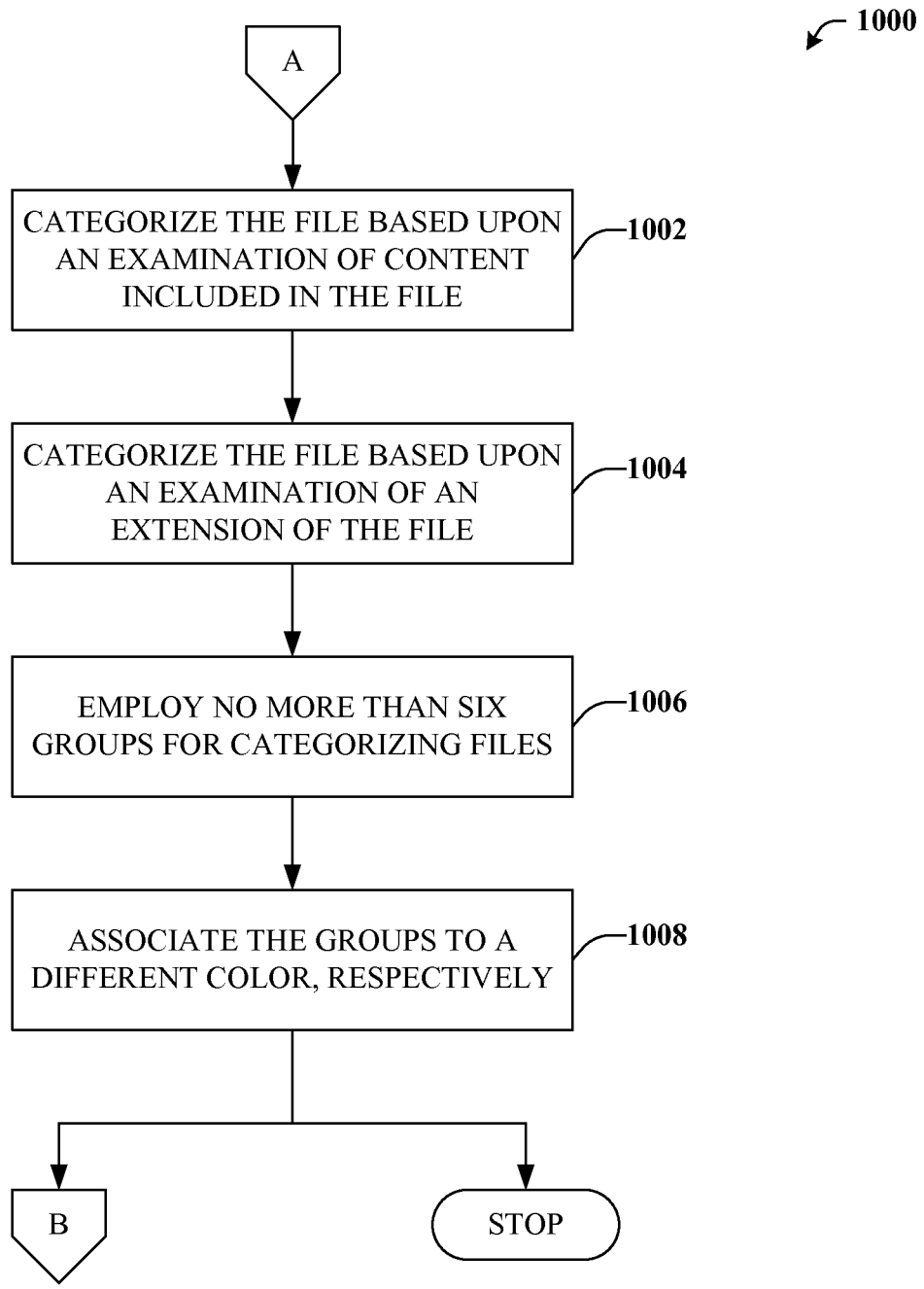
FIG. 10 is an exemplary non-limiting flow diagram for categorizing files or constructing groups in connection with visual cues for file types.
Figure 11:
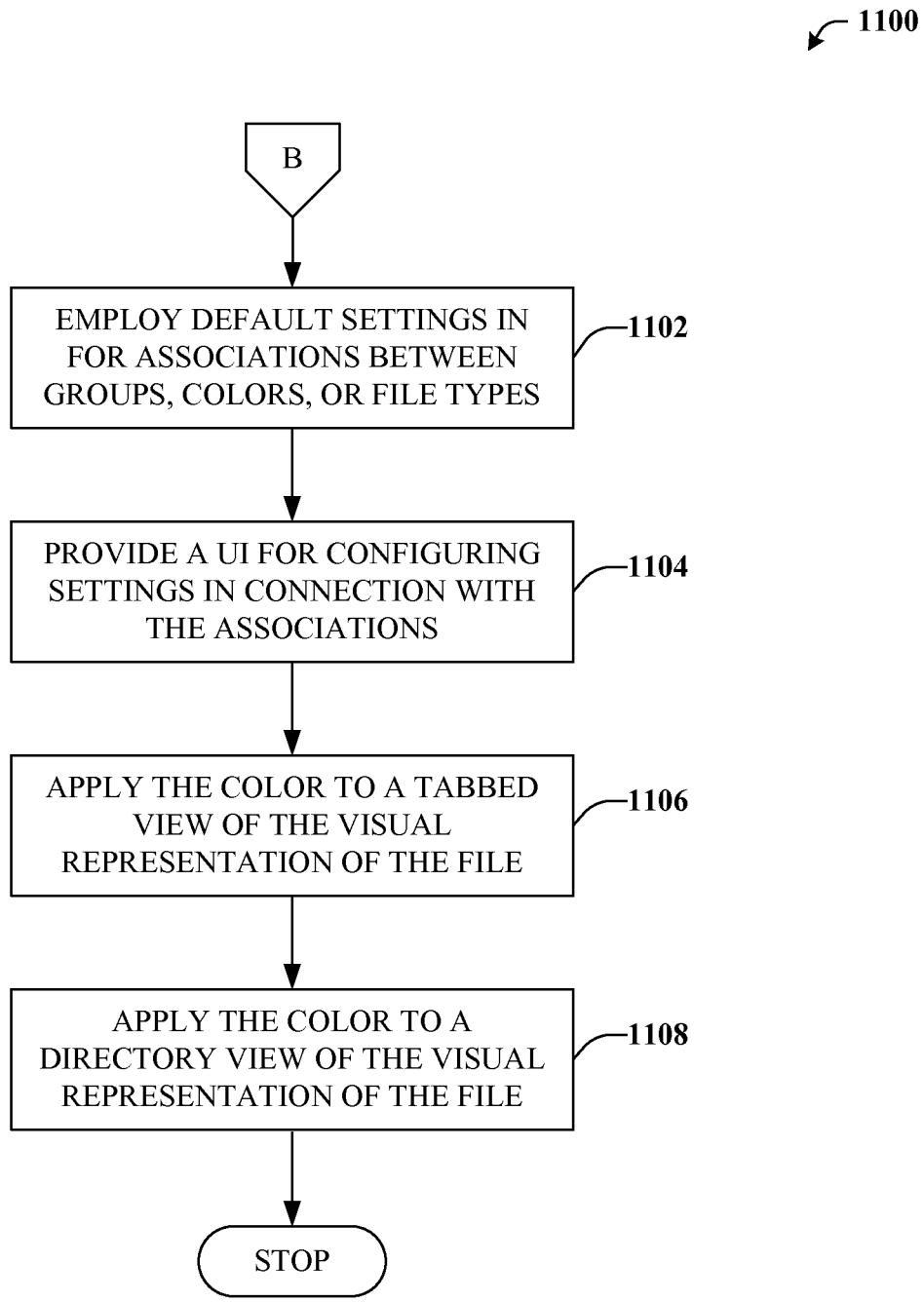
FIG. 11 is an exemplary non-limiting flow diagram for configuring settings or applying colors in connection with visual cues for file types.

FIGS. 9-11 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers.

Referring now to FIG. 9, exemplary method 900 for facilitating visual cues in connection with file types is depicted. Generally, at reference numeral 902, a processor can be employed for examining a file type for at least one file. Such examination of the file type can be accomplished in a variety of ways, as further detailed in connection with FIG. 10.

Next to be described, at reference numeral 904, the at least one file can be categorized into a group associated with a color. In particular, the at least one file can be categorized into the group based upon the examining of the file type provided at reference numeral 902. Once the file has been categorized into a group associated with a color, that color can be applied to one or more visual representation of the at least one file that is presented by an application or an operating system. Various means of applying the color to the one or more visual representation can be utilized, which is detailed further with reference to FIG. 11.

Turning now to FIG. 10, exemplary method 900 for categorizing files or constructing groups in connection with visual cues for file types is illustrated. For example, at reference numeral 1002, the at least one file categorized in connection with reference numeral 904 of FIG. 9, can be categorized based upon an examination of content included in the at least one file. Additionally or alternatively, at reference numeral 1004, the at least one file can be categorized based upon an examination of an extension associated with the at least one file. For instance, an extension included in a file name associated with the at least one file.

In addition, at reference numeral 1106, a set of groups that includes no more than six groups can be employed for categorizing files. In other words, while a given file can be categorized into any one of the available groups, the number of groups employed can be restricted to six or fewer. As such, at reference numeral 1108, the no more than six groups can be respectively associated with a different color. By employing six or fewer groups, various gestalt principles for rapid visual recognition can be employed. Moreover, by employing six of fewer groups, the number of colors can therefore be six or fewer as well, enabling the use of primary colors (e.g., red, blue, and yellow) and secondary colors (e.g., green, orange, and purple). It is understood that in cases in which the at least one file does not properly fit an any of the available groups, then a different color such as gray or black can be assigned any such file.

With reference now to FIG. 11, exemplary method 1100 for configuring settings or applying colors in connection with visual cues for file types is depicted. In general, at reference numeral 1102, default settings can be employed in connection with associations between groups, colors, or files, such as those detailed in connection with reference numeral 904 of FIG. 9. One example of such detailed settings can be found with reference to FIG. 4, which is configured specifically for file types common in web browsing. Naturally, other default settings can exist, and can be constructed for different uses and/or applications.

In addition to employing default settings, or in lieu of any such default settings, at reference numeral 1104, a user interface can be provided for configuring settings in connection with associations between groups, colors, or file types. Thus, users or system commands can be employed to, e.g., define which file types belong to particular groups, as well as what colors those groups will be associated with. One example of such a user interface can be found with reference to FIG. 5.

Furthermore, at reference numeral 1106, the color (e.g., the color associated with a group to which a particular file has been categorized) applied in connection with reference numeral 906, can be applied to a tabbed view of the visual representation of the at least one file. One example of applying a color to a tabbed view of the visual representations is provided in connection with FIG. 6. Likewise, at reference numeral 1108, the color applied can be applied to a directory view of the visual representation of the at least one file. One example of applying the color to a directory view is provided in connection with FIG. 7

Exemplary Networked and Distributed Environments

One of ordinary skill in the art can appreciate that the various embodiments of dynamic composition described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the mechanisms as described for various embodiments of the subject disclosure.

Figure 12:
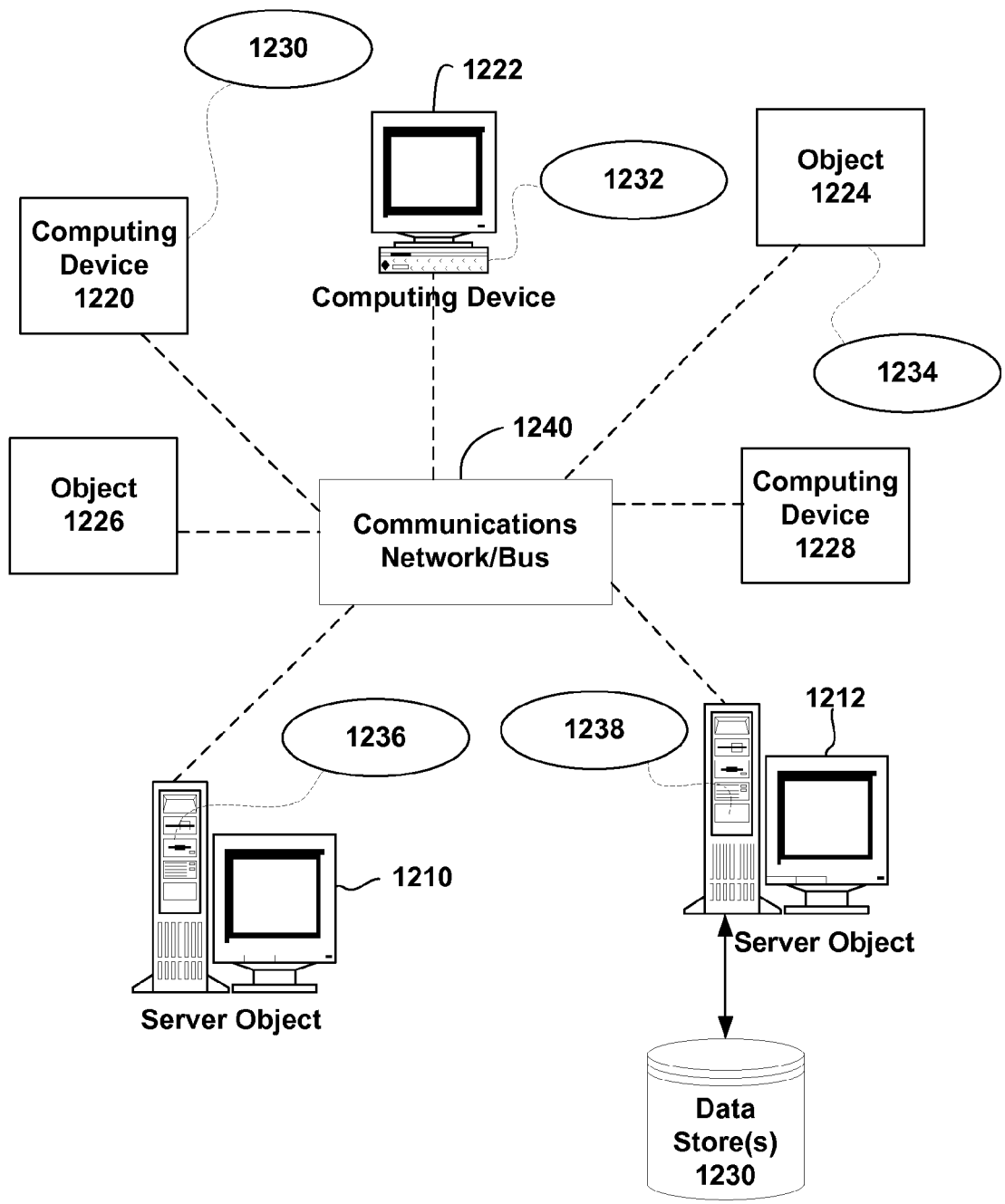
FIG. 12 is a block diagram representing an exemplary non-limiting networked environment in which the various embodiments may be implemented.

FIG. 12 provides a schematic diagram of an exemplary networked or distributed computing environment. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238. It can be appreciated that computing objects 1210, 1212, etc. and computing objects or devices 1220, 1222, 1224, 1226, 1228, etc. may comprise different devices, such as PDAs, audio/video devices, mobile phones, MP3 players, personal computers, laptops, etc.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1240, either directly or indirectly. Even though illustrated as a single element in FIG. 12, network 1240 may comprise other computing objects and computing devices that provide services to the system of FIG. 12, and/or may represent multiple interconnected networks, which are not shown. Each computing object 1210, 1212, etc. or computing objects or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the dynamic composition systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc. provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances. Any of these computing devices may be processing data, or requesting transaction services or tasks that may implicate the techniques for dynamic composition systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing read set validation or phantom checking can be provided standalone, or distributed across multiple computing devices or objects.

In a network environment in which the communications network/bus 1240 is the Internet, for example, the computing objects 1210, 1212, etc. can be Web servers with which the client computing objects or devices 1220, 1222, 1224, 1226, 1228, etc. communicate via any of a number of known protocols, such as the hypertext transfer protocol (HTTP). Computing objects 1210, 1212, etc. may also serve as client computing objects or devices 1220, 1222, 1224, 1226, 1228, etc., as may be characteristic of a distributed computing environment.

Exemplary Computing Device

As mentioned, advantageously, the techniques described herein can be applied to any device where it is desirable to perform dynamic composition. It is to be understood, therefore, that handheld, portable and other computing devices and computing objects of all kinds are contemplated for use in connection with the various embodiments, i.e., anywhere that a device may wish to read or write transactions from or to a data store. Accordingly, the below general purpose remote computer described below in FIG. 2 is but one example of a computing device. Additionally, a database server can include one or more aspects of the below general purpose computer, such as a server or device for the embodiments described herein.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 13:
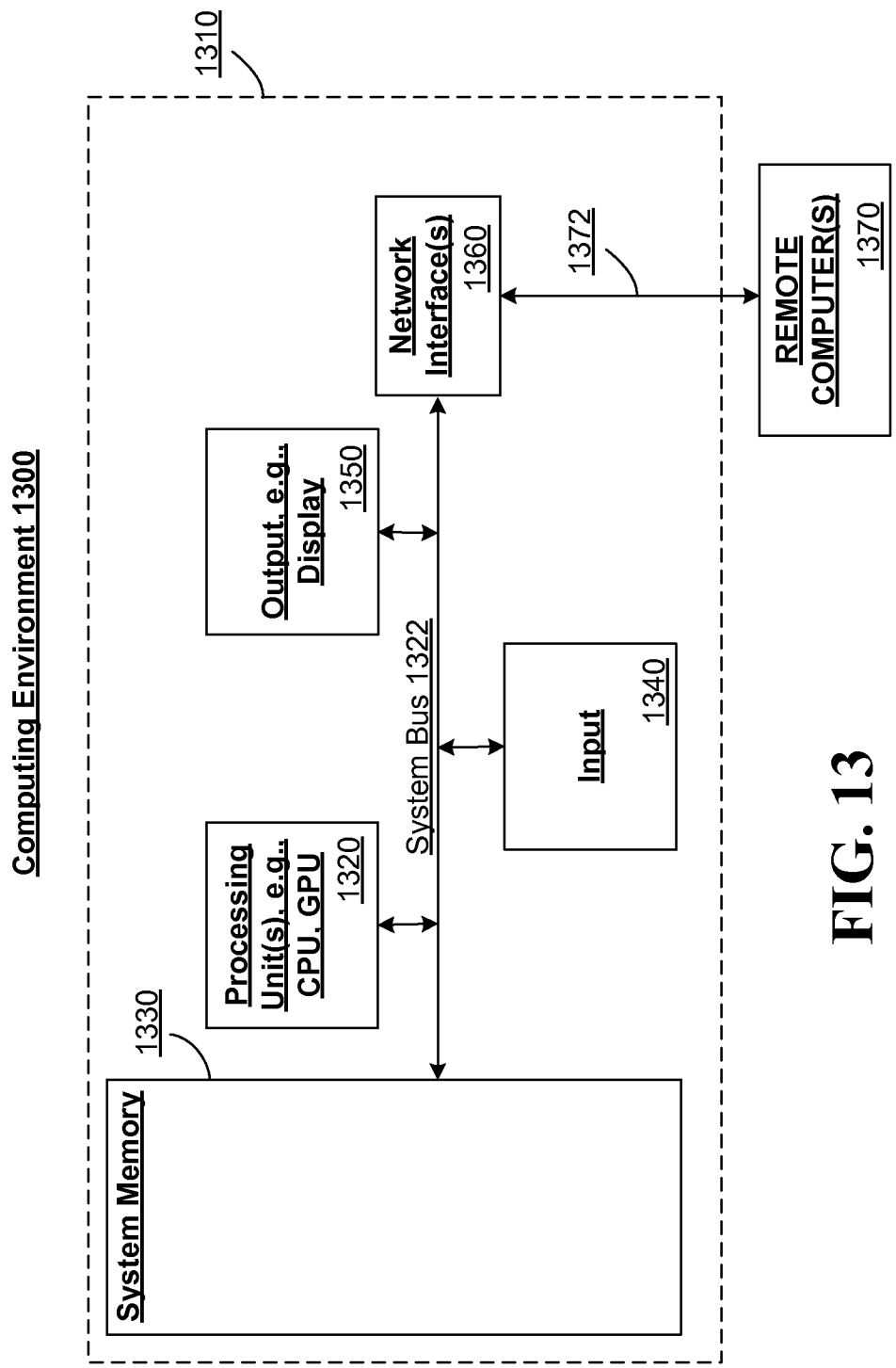
FIG. 13 is a block diagram representing an exemplary non-limiting computing system or operating environment in which the various embodiments may be implemented.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. Neither is the computing environment 1300 be interpreted as having any dependency or requirement relating to any one or combination of components illustrated in the exemplary operating environment 1300.

With reference to FIG. 13, an exemplary remote device for implementing one or more embodiments includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, memory 1330 may also include an operating system, application programs, other program modules, and program data.

A user can enter commands and information into the computer 1310 through input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to categorize by file type.

Also, there are multiple ways to implement the same or similar functionality, e.g., an appropriate API, tool kit, driver code, operating system, control, standalone or downloadable software object, etc. which enables applications and services to take advantage of the various embodiments. Thus, embodiments herein are contemplated from the standpoint of an API (or other software object), as well as from a software or hardware object that implements one or more aspects of the embodiments described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system that facilitates visual cues in connection with file type groupings, comprising:
    a categorization component configured to assign at least one file to a group associated with a color based upon a file type of the at least one file;
    a settings component configured to enable user selection of one or more file extension types for designation of the group to configure the categorization component; and
    a gestalt component, in a computer-readable storage medium, that operatively couples to a file system of an operating system (OS) and to a file editor of a software development environment that presents a content view of contents of the at least one file,
    wherein the gestalt component is configured to apply the color to visual representations of the at least one file in accordance with a color-coding scheme common to multiple types of views presented by the OS and displayed in a user interface of the software development environment, the visual representations being presented by the software development environment and the OS to enable a user to open the at least one file in the file editor via selection of the visual representation,
    wherein the at least one file is one of a plurality of different types of software development files to be opened by the file editor and displayed by the file editor in respective content views of code-based contents of the software development files for editing,
    wherein the gestalt component is further configured to apply respective colors to the respective content views of the file editor in accordance with the color-coding scheme and the different types of software development files, and
    wherein the gestalt component is further configured to apply the respective colors to respective visual representations of the software development files in a directory view of the software development files displayed by a file manager of the software development environment.

2. The system of claim 1, wherein the categorization component is further configured to assign the at least one file to the group based upon an extension associated with the at least one file.

3. The system of claim 1, wherein the categorization component is further configured to assign the at least one file to the group based upon an analysis of content included in the at least one file.

4. The system of claim 1, wherein the categorization component is further configured to assign the at least one file to the group, wherein the group is a member of a set of less than or equal to six groups.

5. The system of claim 4, wherein the color associated with the group is one of a primary color comprising red, blue, or yellow; or one of a secondary color comprising purple, green, or orange.

6. The system of claim 5, wherein at least one of (1) a first group included in the set of no more than six groups is associated with hypertext markup language (HTML) files with at least one of the following extensions: .htm, .html, .hta, .htc, .ss, or .tpl, (2) a second group is associated with cascading style sheet files with a .css extension, (3) a third group is associated with javascript files with a .js extension, (4) a fourth group is associated with code-based files with at least one of the following extensions: .cs, .vb, or .vbs, (5) a fifth group is associated with mixed type files that represent a mixture between code-based files and HTML files with at least one of the following extensions: .aspx, .asmx, .asax, .ascx, .ashx, .master, .skin, .svc, .asp, .asa, .cshtml, .vbhtml, .aspq, .php, .phps, .class, .install, .module, .ini, or .inc, or (6) a sixth group is associated with extensible markup language (XML) or structured query language (SQL) with at least one of the following extensions: .xml, .config, .xaml, .xoml, .csproj, .settings, .xsd, .xsl, .xslt, .wsdl, .browser, .mxml, .dbml, .user, .resx, or .sql.

7. The system of claim 1, wherein the settings component is further configured to enable associations between groups and colors based upon one or more selections.

8. The system of claim 7, wherein the one or more selections are based upon input received from a user interface.

9. The system of claim 1, wherein the gestalt component is further configured to apply the color to a tabbed view of the visual representation of the at least one file.

10. The system of claim 1, further comprising a sorting component configured to sort respective visual representations of the at least one file as a function of the color.

11. A system that facilitates visual cues for file type groups in connection with software development, comprising:
    a categorization component configured to catalog a file, based upon an examination of a file type of the file, into a file group that is associated with a color;
    a settings component configured to enable user selection of one or more file extension types for designation of the file group to configure the categorization component; and
    a presentation component, in a computer-readable storage medium, that operatively couples to a software development environment and an operating system (OS),
    wherein the presentation component is configured to present the color in connection with visual representations of the file in accordance with a color-coding scheme common to multiple types of views presented by the OS and displayed in a user interface presented by the software development environment, the visual representations being presented by the software development environment and the OS to enable a user to open the file in a file editor of the software development environment via selection of the visual representation, wherein the file is one of a plurality of different types of software development files to be opened by the file editor and displayed by the file editor in respective content views of code-based contents of the software development files for editing, wherein the presentation component is configured to apply respective colors to the respective content views of the software development files in accordance with the color-coding scheme and the different types of software development files, and wherein the presentation component is further configured to apply the respective colors to respective visual representations of the software development files in a directory view of the software development files displayed by a file manager of the software development environment.

12. The system of claim 11, wherein the software development environment is an environment associated with website development.

13. The system of claim 11, wherein the categorization component is further configured to catalog the file into the group based upon an extension associated with the file or based upon an analysis of content included in the file.

14. The system of claim 11, wherein the categorization component is further configured to catalog the file into the group, wherein the group is a member of a set of exactly six groups associated with respective colors.

15. The system of claim 11, further comprising a sorting component configured to sort the visual representation of the file as a function of the color.

16. The system of claim 11, wherein the presentation component is further configured to present the color to a tabbed view of the visual representation of the file.

17. A method for facilitating visual cues in connection with file type grouping, comprising:
receiving a user selection of one or more file extension types for designation of a respective group of a plurality of groups;
analyzing a file type for at least one file;
categorizing the at least one file into the respective group in accordance with the user selection, the respective group being associated with a color based upon the file type of the at least one file determined by the analyzing;
applying the color to visual representations of the at least one file in accordance with a color-coding scheme common to multiple types of views presented by a software development environment and an operating system (OS), the visual representations being presented by the software development environment and the OS to enable a user to open the at least one file in a file editor of the software development environment via selection of the visual representation, wherein the at least one file is one of a plurality of files of different types of software development files to be opened by the file editor and displayed by the file editor in respective content views of code-based contents of the software development files for editing; and
applying respective colors to the respective content views of the software development files in accordance with the color-coding scheme and the different types of software development files, and further applying the respective colors to respective visual representations of the software development files in a directory view of the software development files displayed by a file manager of the software development environment.

18. The method of claim 17, further comprising at least one of the following acts:
categorizing the at least one file based upon an analysis of content included in the at least one file;
categorizing the at least one file based upon an analysis of an extension associated with the at least one file;
employing no more than six groups for categorizing the at least one file; or
associating the no more than six groups to a different color, respectively.

19. The method of claim 17, further comprising at least one of:
employing default settings in connection with associations between groups, colors, or file types;
providing a user interface (UI) for configuring settings in connection with associations between the groups, the colors, or the file types; or
applying the color to a tabbed view of the visual representation of the at least one file.

* * * * *